United States Patent
Baransky et al.

(10) Patent No.: US 8,521,824 B2
(45) Date of Patent: Aug. 27, 2013

(54) VENUE-CENTRIC SOCIAL NETWORK

(75) Inventors: Lou Baransky, Kirkland, WA (US); Michele Phillips-Baransky, Kirkland, WA (US); Christopher Phillips, Kent, WA (US)

(73) Assignee: Your Icebreaker, LLC, Kirkland, WA (US)

( * ) Notice: Subject to any disclaimer, the term of this patent is extended or adjusted under 35 U.S.C. 154(b) by 341 days.

(21) Appl. No.: 12/939,906

(22) Filed: Nov. 4, 2010

(65) Prior Publication Data

US 2011/0106896 A1    May 5, 2011

Related U.S. Application Data

(60) Provisional application No. 61/258,045, filed on Nov. 4, 2009.

(51) Int. Cl.
*G06F 15/16* (2006.01)

(52) U.S. Cl.
USPC .......................................................... 709/206

(58) Field of Classification Search
USPC .......................................................... 709/206
See application file for complete search history.

(56) References Cited

U.S. PATENT DOCUMENTS

| | | | |
|---|---|---|---|
| 7,634,544 B2 * | 12/2009 | Kramer et al. ................ | 709/206 |
| 8,005,906 B2 * | 8/2011 | Hayashi et al. ................ | 709/206 |
| 8,214,241 B2 * | 7/2012 | Kaiser .......................... | 705/7.13 |
| 2002/0115453 A1 | 8/2002 | Poulin et al. | |
| 2007/0250336 A1 | 10/2007 | Khoury | |
| 2007/0271367 A1 * | 11/2007 | Yardeni et al. ................ | 709/223 |
| 2008/0140650 A1 | 6/2008 | Stackpole | |
| 2009/0215469 A1 | 8/2009 | Fisher et al. | |
| 2009/0248807 A1 * | 10/2009 | Fron et al. .................... | 709/206 |
| 2010/0017725 A1 * | 1/2010 | McCarthy et al. ............. | 715/745 |
| 2010/0161788 A1 * | 6/2010 | Boss et al. .................... | 709/224 |
| 2010/0318622 A1 * | 12/2010 | Granito et al. ................ | 709/206 |
| 2010/0323667 A1 * | 12/2010 | Oschwald et al. ........... | 455/412.2 |
| 2011/0004501 A1 * | 1/2011 | Pradhan et al. ................ | 705/8 |
| 2012/0004956 A1 * | 1/2012 | Huston et al. ................ | 705/14.1 |
| 2012/0143963 A1 * | 6/2012 | Kennberg et al. ............. | 709/206 |
| 2012/0150901 A1 * | 6/2012 | Johnson et al. ............... | 707/769 |
| 2012/0221659 A1 * | 8/2012 | Brown et al. ................. | 709/206 |

OTHER PUBLICATIONS

International Search Report and Written Opinion for PCT/US2010/055471 with an international filing date of Nov. 4, 2010, mailed from the International Searching Authority on Jul. 15, 2011, 9 pgs.

* cited by examiner

*Primary Examiner* — Brian P Whipple
(74) *Attorney, Agent, or Firm* — John R. Thompson; Stoel Rives LLP

(57) ABSTRACT

A venue may be registered with a venue-centric social networking service. The venue may be associated with a physical location where subscribers may congregate. Subscribers may join the venue by visiting the physical location, receiving an invitation, receiving a password (or other credential), or the like. The venue-centric social networking service may track which subscribers are at which venues and provide a "Who's here" listing to other subscribers. Subscribers at the same venue may be introduced to one another through the venue-centric social networking service by, inter alia, browsing the profiles of the subscribers in the "Who's here" list and/or initiating contact with other subscribers at the venue through the venue-centric social networking service. Subscriber visibility and contact preferences may be determined by subscriber privacy settings and/or privacy settings of the venues.

27 Claims, 4 Drawing Sheets

VENUE-CENTRIC SOCIAL NETWORK

CROSS-REFERENCE TO RELATED APPLICATIONS

This application claims the benefit under 35 U.S.C. §119(e) of U.S. Provisional Patent Application No. 61/258,045 filed on Nov. 4, 2009, and entitled "Venue-Centric Social Network," which is hereby incorporated by reference in its entirety.

TECHNICAL FIELD

The following relates to social networking and, in particular, to venue-centric social networking services.

DETAILED DESCRIPTION OF PREFERRED EMBODIMENTS

Figure 1:
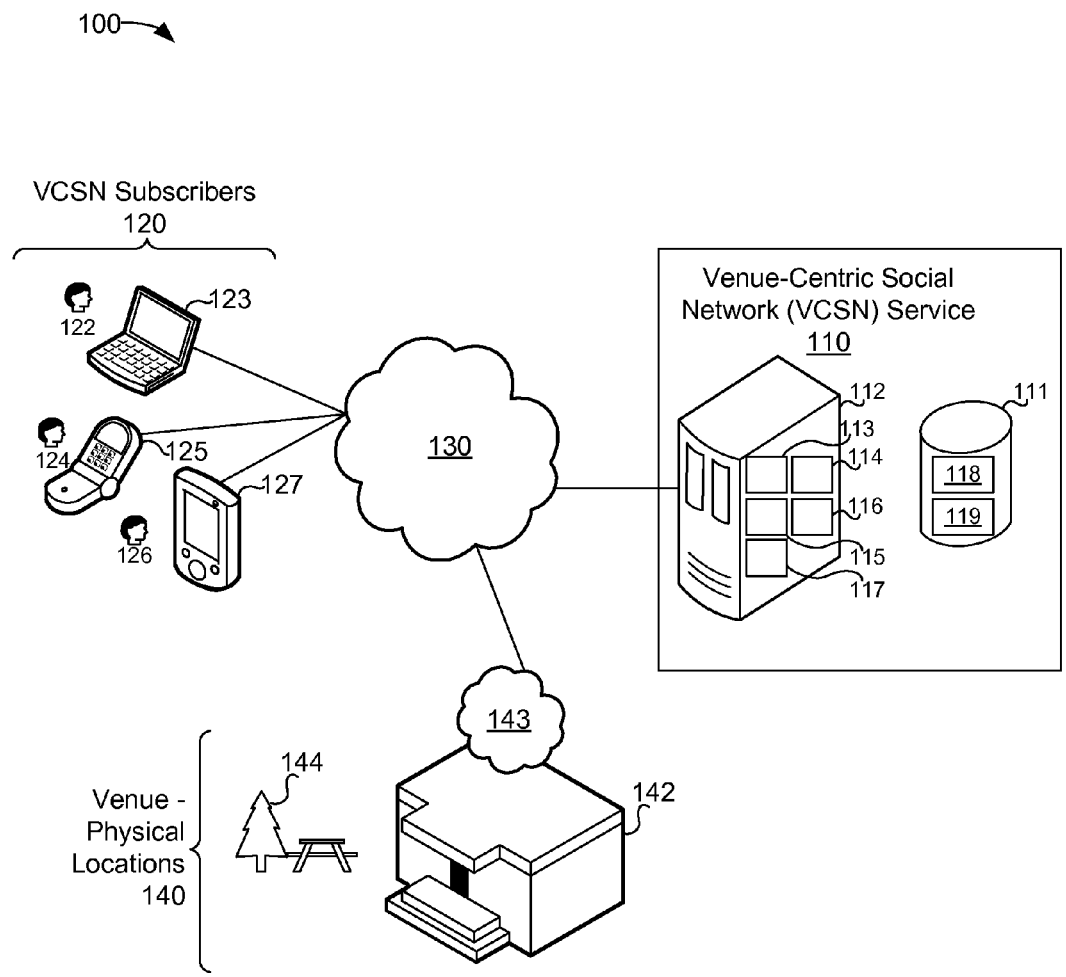
FIG. 1 is a block diagram of one embodiment of a system for providing venue-centric social networking services.

Disclosed herein is a venue-centric social network (VCSN) that may be used to, inter alia, introduce subscribers to one another. The introductions may be made between VCSN subscribers that are at the same location (e.g., at the same venue, attending the same event, etc.) and/or who tend to frequent the same venues.

In some embodiments, a user may subscribe to the VCSN by registering a subscriber account. Registration may include providing a subscriber name, description (e.g., gender, age, etc.), locale or address, contact information (e.g., email address, mobile phone number, SMS address, etc.), and the like. A profile may provide additional descriptive information about the subscriber, such as an avatar, image, descriptive text (e.g., likes-dislikes, status, etc.), and so on. The profile may specify subscriber preferences including, but not limited to: invitation preferences, which may determine whether the user can be contacted by other VCSN subscribers, blocking preferences, which may block certain VCSN subscribers from contacting the user, search preferences, visibility preferences, and the like.

The VCSN may include one or more venues. As used herein, a "venue" represents a physical location in which users of the VCSN may congregate in the VCSN. A venue may be associated with (e.g., represent) a particular business, club, entity, or other organization (a "sponsored" venue). A venue may be sponsored by various different organizations including, but not limited to: clubs, night clubs, bars, hotels, restaurants, resorts, theme parks, theaters, concert venues, or the like. Venues may be "un-sponsored." As used herein, an un-sponsored venue is not associated with any particular business or organization, and can be created by any VCSN subscriber. Examples of un-sponsored venues include: public locations, such as parks, recreation areas, or the like, community locations, such as tennis courts, municipal pools, or the like, and so on.

A venue may be registered with the VCSN and assigned a password or other qualifier. Registration of a sponsored venue may include an authentication step wherein the VCSN subscriber attempting to register the venue proves that he/she is authorized to act on behalf of the sponsoring organization. An un-sponsored venue may be registered by any VCSN subscriber.

In some embodiments, venues may be registered for a pre-determined time period. For example, a venue created for a conference may be registered for the duration of the conference and may be removed thereafter. In some examples, the physical location of different venues may over lap one another. For example, a conference center may concurrently host multiple conferences. Separate venues may be registered for the different conferences despite the fact that the physical locations of the conferences overlap. Alternatively, the VCSN may prevent the same physical location from being associated with more than one venue (may prevent "overlapping" venues").

Each venue may be associated with a web portal or "virtual venue" in the VCSN. The virtual venue may represent the physical location in the VCSN. The virtual venue may include a listing of the subscribers who are currently at the venue. Subscribers may view the profiles of other members of the venue (whether at the venue or not), see which subscribers are currently at the venue, chat with other members of the venue, and so on.

A subscriber may join a venue by visiting the virtual venue (web portal) and requesting a password (or other credential) from a venue administrator. A venue administrator may be any VCSN subscriber who is authorized to manage a venue. Accordingly, the venue administrator may be the subscriber who registered the venue, a delegate, or other authorized subscriber of the VCSN. Alternatively, or in addition, subscribers may join a venue in the VCSN by visiting the physical location of the venue. When a subscriber visits the venue, the subscriber may be given a password or other credential (either physically or electronically), which may be used to access the virtual venue through the VCSN. Alternatively, or in addition, when the subscriber visits the venue, a password or credential may be automatically included in the subscriber's profile on the VCSN. In some embodiments, the login information may be provided to the subscriber automatically based upon the subscriber's presence at the venue. For example, the subscriber may have a location-aware communication device, such as a cellular phone, PDA, tablet computer, laptop computer, netbook, or the like, which may be configured to transmit location information to the VCSN. Using the location information, the VCSN may detect when the subscriber visits a particular venue and, upon detection of a subscriber visit, a venue credential may be associated with the subscriber (e.g., in a profile of the subscriber maintained by the VCSN). Alternatively, or in addition, the venue may provide means for distributing a credential, such as a venue-provided wireless network, a Bluetooth® network, a USB key, or the like. The venue may broadcast the credential (via a network), which may be received by a mobile device of one or more VCSN subscribers visiting the venue.

A venue administrator may manage the subscribers that are members of the venue (allowed to log into the virtual venue provided by the VCSN). A subscriber may be banned from a virtual venue by an administrator for inappropriate behavior (e.g., stalking other subscribers, violations of venue terms of service, or the like). The venue administrator may issue invitations to VCSN subscribers to encourage them to join the venue (e.g., special offers, etc.). These invitations may be distributed through the VCSN (in accordance with subscriber preferences), at the physical location of the venue (in a flyer, via a venue-network, or the like), or by other means (e.g., subscriber-to-subscriber, email, etc.).

The VSCN service may provide messaging services to facilitate "real life" meetings between subscribers. For example, VCSN subscribers who are logged into a virtual venue may send messages to other subscribers via the VCSN. The messaging may include web-based messaging (e.g., web-forum type messaging), peer-to-peer messaging, SMS messaging, instant messaging, push messaging, or the like. A subscriber may also send messages to off-line subscribers in the form of an email-type messages. The VCSN may include a web accessible "message box" to receive offline messages. A subscriber may establish privacy settings to control how the subscriber can be contacted. For example, a subscriber may establish an "ignore" list, which may prevent certain users from contacting the subscriber. Similarly, a subscriber may establish a "friend" list, which may provide for increased access to the subscriber's profile, additional messaging options, and the like. The privacy settings may also specify how messages submitted (broadcast) by the subscriber are to be disseminated. For example, a subscriber may specify that his/her broadcast messages can be visible to all the members of a particular venue, to only the subscribers currently visiting the venue, and/or another subscriber subset. The venue may include similar privacy settings. For example, a venue may be "private," such that the virtual venue (and "Who's here" list, described below) are only accessible to members of the venue (or members who are currently visiting the venue).

When a subscriber visits a venue, the subscriber may set an "I'm here" flag on his/her VCSN profile. The "I'm here" flag may be set by transmitting an "I'm here" message to the VCSN via a network. The "I'm here" flag may indicate to the VCSN that the subscriber is currently at a particular venue. Accordingly, the subscriber may appear in a "Who's here" list of the virtual venue (discussed below). The messaging features described above (peer-to-peer messaging, and so on) may be used between subscribers that are at the same venue (e.g., physical location) to facilitate "real life" meetings therebetween. The dissemination of subscriber messages and/or "I'm here" flags may be limited by the privacy settings described above.

The "I'm here" flag may be set by manually (e.g., by the subscriber logging into the VCSN and/or virtual venue and setting an "I'm here" flag on his/her account). Alternatively, or in addition, the VCSN may automatically determine that a user is at a particular venue and set the subscriber's "I'm here" flag to the appropriate venue. For example, a subscriber may have a mobile communication device that is capable of communication with the VCSN. The device may, therefore, periodically update the VCSN with the subscriber's location. The VCSN may be capable of identifying the venue based on the location information. In another example, the venue itself may include a communication capability, such as venue-provided wireless network (e.g., hotspot), Bluetooth® network, or the like. As subscribers access the venue network, a "I'm here" message may be automatically sent to the VCSN. The automatic location designation mechanisms described above could be adapted to include a verification step by the subscriber. Although a particular set of communications mechanisms are described herein, the disclosure is not so limited in this regard and could be extended to include any communications network, protocol, and/or messaging technique known in the art.

FIG. 1 is a block diagram of one embodiment of a system for providing venue-centric social networking services. A plurality of subscribers of the VCSN 120 may be communicatively coupled to a venue-centric social networking service 110 ("VCSN service") via a network 130. The VCSN service 110 may include one or more computing devices 112 and one or more non-transitory computer-readable storage media 111. A computing device 112 of the VCSN service 110 may include processing resources 113, communications interfaces 114, memory 115, non-transitory computer-readable storage media 116 (disc, optical media, etc.), and the like. The non-transitory computer-readable storage media 111 may comprise one or more discs, optical storage media, and the like. The storage media 111 may be accessible to the one or more computing devices 112 of the VCSN service 110 (e.g., as network attached storage, internal computer-readable storage media of one or more of the computing devices 112, or the like).

The computing devices 112 may be configured to communicate with the users 120 via the network 130. Accordingly, one or more of the computing devices 112 may include a server module 117. The server module 117 may be capable of providing web server services (e.g., servicing HTTP and/or HTTPS requests from the subscribers 120, and so on) and/or performing other server functions, such as providing for file transfers, peer-to-peer communications (communications between the users 120), acting as a communications relay between VCSN subscribers 120, and so on.

The VCSN subscribers 120 may access the VCSN service 110 via the network 130 using any communication protocol and/or mechanism known in the art, and using any number of different types of devices including, but not limited to: a computing device (e.g., a portable computer, a tablet, a Netbook, a personal computer, a desktop computer, or the like), a phone (e.g., a telephone, a smart phone, a cellular phone, a VOIP phone, or the like), a personal digital assistant (PDA), or the like. In the FIG. 1 example, subscriber 122 is shown accessing the VCSN service 110 using a portable computing device 123, subscriber 124 is shown accessing the VCSN service 110 using a cellular phone 125, and subscriber 126 is shown accessing the VCSN service 110 using a PDA 127.

The VCSN subscribers 120 may subscribe to the VCSN service 110 by submitting registration information, such as a name, description, contact information, and the like. Using the registration information, the VCSN service 110 may establish respective user profiles 118 for the VCSN subscribers 120 on the non-transitory computer-readable storage media 111. The subscribers 120 may be allowed to add, remove, and/or edit user profile information via the VCSN service 110. In some embodiments, portions of the user profile information 118 may available to other VCSN subscribers 120. Access to subscriber profile information 118 may be controlled by privacy settings.

One or more venues 140 (e.g., venue physical locations) may be registered with the VCSN service 110. As described above, a venue 140 may refer to any physical location where VCSN subscribers 120 may congregate and/or meet one another. The system 100 may include a plurality of venues 140, including a sponsored venue 142 and an un-sponsored venue 144. The sponsored venue 142 may be associated with an organization (e.g., a soccer club, bar, night club, hotel, conference center, theme park, resort, cruise ship, sports arena, etc.). An authorized person of the venue 142 (e.g., an owner or manager of the associated business or organization) may register the venue with the VCSN service 110. Registration may include verifying that the subscriber 120 attempting to register the venue is authorized to do so. An un-sponsored venue 144 may be registered by any VCSN subscriber 120 and may be associated with a public location, such as a park or other accessible gathering place or location. The venue registration information, including the venue address, description, photos, subscriber list, and the like, may be maintained in a venue data structure 119 on the non-transitory computer-readable storage media 111. The venue data structure 119 may also include a membership list identifying the VCSN subscribers 120 who are members of the venue and list of administrators comprising the VCSN subscribers 120 that are authorized to manage the venue data structure 119 (e.g., add, remove, and/or modify venue membership, set venue privacy settings, etc.).

The VCSN service 110 may provide a web portal (virtual venue) for each of the registered venues 140. In some embodiments, the virtual venues may be accessible only to those VCSN subscribers 120 who have become members of the venue. A VCSN subscriber 120 may become a venue member in various ways. For example, a VCSN subscriber 120 may join by visiting the virtual venue provided by the service 110 and submitting a membership request to venue administrators. Alternatively, or in addition, a subscriber may attend the venue itself. At the venue, a password or other credential may be provided, which the subscriber 120 may use to join the virtual venue.

The virtual venue provided by the VCSN service 110 may include a listing of the VCSN subscribers 120 who are members of the venue. Access to the membership list may be controlled by venue privacy settings and/or subscriber privacy settings. For example, a venue may be designated as a private venue, such that the membership list is only accessible to other members of the venue. By contrast, the membership of a public venue may be accessible to non-members. In some embodiments, VCSN subscribers 120 may opt-in and/or opt-out of inclusion in a venue membership list. For example, a VCSN subscriber 120 may designate that he/she is to be omitted from the venue membership list (or is only to be visible to a pre-determined set of subscribers).

Each virtual venue may include a "Who's here" listing that identifies the VCSN subscribers 120 who are currently visiting the venue 140 (subscribers that have set the "I'm here" flag on their VCSN subscriber account). As above, the visibility of a VCSN subscriber 120 "Who's here" listing may be controlled by privacy settings. For example, the "Who's here" listing may only be accessible by members of the venue 140. Alternatively, or in addition, individual VCSN subscribers 140 may specify their level of visibility in "Who's here" listings.

When a subscriber 120 visits a venue 140, the subscriber may contact the VCSN service 110 to set an "I'm here" flag. The "I'm here" flag may be set in various ways including, but not limited to: a manual operation by the user 120, a communication initiated by a mobile communication device of the user 120, a communication initiated by a venue 140, or the like.

A VCSN subscriber 120 may set the "I'm here" flag by performing a manual operation, such as transmitting a message (using a communication device) to the VCSN service 110 that identifies the venue 140. Alternatively, or in addition, a venue 140 itself may provide an "I'm here" service, which may allow the VCSN subscribers 120 at the venue to set their "I'm here" flags without the use of a mobile communication device. For instance, the venue 140 may provide a terminal (e.g., a kiosk-based computing device, a VCSN service-specific terminal, or the like), which may be available to the venue attendees. The kiosk (or other device) may provide registration services to allow non-subscribers to subscribe to the VCSN service 110 (register an account with the VCSN service 110). In another example, a VCSN subscriber 120 may set an "I'm here" flag from a home computer before arriving at the venue 140.

In some embodiments, the "I'm here" flag may be automatically set using a mobile communication device of the subscriber 120. For example, the subscriber 120 may have a device that is capable of receiving location information (e.g., may include a GPS receiver, a WiFi receiver, a wireless network interface, or the like). The device may be configured to transmit location information to the VCSN service 110 (e.g., GPS coordinates, IP address, WiFi access tower, etc.). Using the location information, the VCSN service 110 may automatically identify the venue 140 the subscriber 120 is attending. The transmission of the location information may occur automatically (e.g., without user intervention) and/or only upon approval of the subscriber. Alternatively, even if the location information is automatically transmitted to the VCSN service 110, the "I'm here" flag may not be set until approval is received from the subscriber 120. Similarly, the "I'm here" flag may not be set until the subscriber has been in the vicinity of the venue 140 for a threshold period of time (to prevent the "I'm here" flag from being set when a subscriber 120 is simply passing through the venue 140).

In some embodiments, a particular venue (venue 142) may provide a venue network 143 for venue attendees, which may include a Bluetooth® network, a wireless access point (Hotspot), a WiFi access point, or the like. The venue network 143 may be used to facilitate setting the "I'm here" of the subscribers 120 attending the venue 142. For example, when a subscriber 120 accesses the venue network 143, an "I'm here" message may be automatically transmitted to the VCSN service 110. Alternatively, or in addition, the transmission may be initiated by the VCSN subscriber 120. For instance, when a user 120 connects to the venue network 143, the subscriber 120 may be prompted to transmit an "I'm here" message to the VCSN service 110. If a visitor to the venue is not a VCSN subscriber 120 and/or is not a member of the venue 142, the venue network 143 may provide an invitation to join.

In some embodiments, the "I'm here" message transmission described above may include a verification step configured to prevent subscribers 120 from claiming to be at a particular venue 140 when they are not actually there. The verification may include examining the mechanism used to transmit the "I'm here" message (e.g., examining the source IP address, the route of the message, or the like). Alternatively, or in addition, the "I'm here" message may include location information, such as GPS coordinates, an IP address, a wireless network access point identifier, or the like. The location identifying information may be used to verify that the subscriber 120 is at or in the vicinity of a particular venue 140.

Although a particular set of mechanisms for transmitting an "I'm here" message to the VCSN service 110 are described, the disclosure is not limited in this regard; the embodiments taught herein could be adapted to incorporate any location identification and/or network communication technique known in the art.

As described above, the VCSN service 110 may provide venue-aware social networking services using, inter alia, the "I'm here" messages from the subscribers 120. For instance, the VCSN service 110 may use the "I'm here" messages to generate "Who's here" listings indicating which subscribers 120 are at which venues 140. In some embodiments, the "Who's here" listings may be available to all of the VCSN subscribers 120 regardless of the subscribers' venue memberships and/or current venue attendance. Alternatively, access to the "Who's here" listings may be limited to members of the relevant venue 140 and/or to VCSN subscribers 120 who are also currently at the venue and/or may be controlled by subscriber-specific privacy settings.

The "Who's here" listing of a particular venue (e.g., venue 142) may be used to facilitate subscriber interactions. For example, the VCSN service 110 may provide messaging services to facilitate "real life" meetings at the venues 140. In one example, the virtual venue provided by the VCSN service 110 may include a chatroom, in which the subscribers 120 attending the venue may communicate. The VCSN service 110 may facilitate subscriber-to-subscriber communications. For example, a first subscriber 122 who is attending the venue 142 (and has set his/her "I'm here" flag) may access a "Who's here" list for the venue 142 to find a second subscriber 124 who is also attending the venue 142. The VCSN service 110 may allow the first subscriber 122 to transmit a message directly to the second subscriber 124. The message may take the form of a text message (such as an Short Message Service (SMS) message sent through a cellular telephone network), a peer-to-peer message, an Instant message (e.g., through an instant messaging system, such as MSN Messenger®, Yahoo! Messenger®, Internet Relay Chat (IRC), etc.), or the like. In some embodiments, the VCSN service 110 may act as a relay for messages between subscribers 120, such that a message from the first subscriber 122 to the second subscriber 124 is first transmitted to the VCSN service 110, which, in turn, retransmits the message to the subscriber 124. In this way, the contact information of the subscriber 124 need not be exposed to the subscriber 122. The retransmission performed by the VCSN service 110 may comprise translating the message into a different messaging format in accordance with preferences of the subscribers 122 and/or 124. For instance, the subscriber 122 may submit a message for the subscriber 124 to the VCSN service 110 via a web form provided thereby (e.g., via an HTTP post operation), and the VCSN service 110 may retransmit the message to the subscriber 124 in another form (SMS text message, instant message, voice message, or the like). Alternatively, the "Who's here" list may display contact information for other VCSN subscribers 120 at the venue, which may be used to initiate subscriber-to-subscriber communications. In addition, the virtual venue provided by the VCSN service 110 may include a messaging system, such as a chatroom, message board, message broadcast, or the like, on which venue members may communicate. Access to subscriber messages may be controlled by subscriber privacy settings and/or privacy settings of the venue. For example, a subscriber may specify that his/her messages are to be disseminated only to a pre-selected group of subscribers (e.g., "friends"). Privacy settings may further specify that the subscriber's messages are to be limited to those who are at the same venue as the subscriber. For example, if the subscriber is currently visiting a particular venue "A," then messages broadcast by the subscriber may be accessible only to those subscribers who are also currently visiting the venue "A." The messaging system provided by the VCSN service 110 may enforce the privacy restrictions of the subscribers and/or may impose its own privacy settings (venue privacy settings). For example, messages posted to the messaging system of the virtual venue may be accessible to all the VCSN subscribers 120 that are members of the venue (regardless of whether they are currently visiting the venue's physical location). Alternatively, the virtual venue messaging system may restrict access to the messaging system (and/or other portions of the virtual venue) to the venue members that are currently visiting the physical location of the venue 142.

The VCSN service 110 may provide venue browsing and venue search features. A venue browse feature may allow a VCSN subscriber 120 to view the venues 140 that have registered with the VCSN service 110. The browse feature may provide a categorized listing of the venues that have registered with the VCSN service 110. The categorization may include, but is not limited to: categorization by location, venue type (e.g., bar, restaurant, club, sponsored/un-sponsored, etc.), rating, target clientele, business name (e.g., by franchise chain), or the like. The browsing feature may also categorize venues according to the VCSN subscribers 120 who are members of the venue (e.g., the average age of the venue members, education level, interests, etc.). Using the browse feature, a VCSN subscriber may discover venues 140 that he/she may be interested in joining. A venue search feature may allow a subscriber 120 to find a particular venue 140 of interest. The venue search may be based upon a particular set of subscribers (e.g., find venues that a particular subscriber 120 has joined), the location of the venue, keywords, venue type, or the like.

Figure 2A:
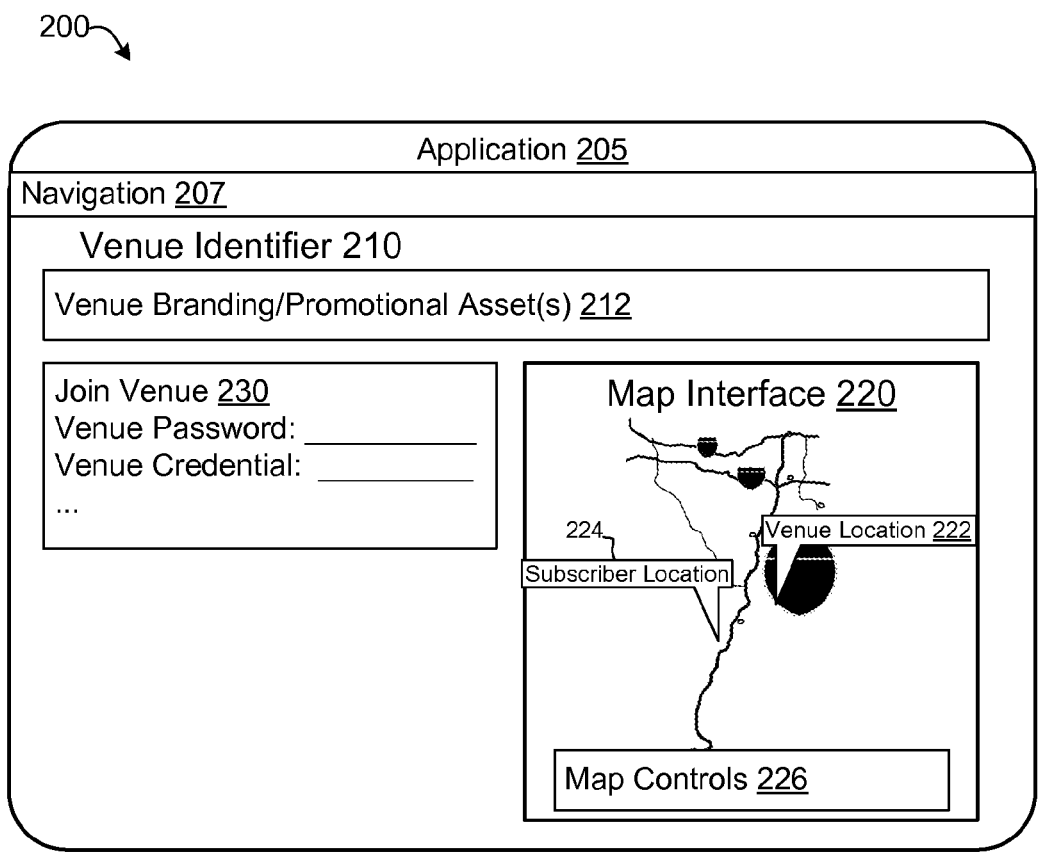
FIG. 2A illustrates one example of an interface for joining a venue.

FIG. 2A depicts one example of an interface for presenting information pertaining to a virtual venue provided by a VCSN service, such as the VCSN service 110 of FIG. 1. The interface 200 may be presented in a number of different forms adapted for a number of different devices (e.g., computers, handheld devices, etc.). In the FIG. 2A example, the interface 200 may be configured for viewing within a web browser application 205, such as Microsoft InternetExplorer®, Mozilla Firefox®, a portable browser, or the like. In other embodiments, the interface 200 may be presented in an alternative form, such as within a mobile communication device (e.g., as a dedicated application, a WAP application, or the like), on a dedicated terminal, or the like.

The interface 200 may include a navigation component 207 to allow the subscriber to browse/search for other venues registered in a VCSN. The navigation component 207 may be adapted to receive search criteria, a venue identifier, subscriber identifier, or the like. In response to input in the navigation component 207, a different set of virtual venues may be displayed in the interface 200.

Venue branding and promotional assets 212 may be included to promote the venue. The assets may include coupons that may be used at the venue's physical location, current venue offers, special events happening at the venue, and so on. In some embodiments, the interface 200 may include a map interface 220, which may display the location of the venue's physical location 222. If a location of the subscriber is available (e.g., the subscriber is accessing the interface 200 using a location-aware device and/or the subscriber location can be estimated from an IP address or other information), the location of the subscriber 224 relative to the venue location 222 may be displayed. Map controls 226 may be provided to allow the subscriber to manipulate the map 220, obtain directions to the venue location 222, search for other nearby venues, or the like.

If the subscriber accessing the virtual venue interface 200 is not a member of the venue, a join venue component 230 may be included. The component 230 allows the subscriber to request membership in the venue. As discussed above, a subscriber may join a venue in various ways. A subscriber may request venue membership via the interface before visiting the physical location 222 of a venue. A subscriber may visit the venue physical location and may receive a password or other credential while there. Alternatively, a venue password or credential may be automatically provided to the subscriber via an invitation message or via a "push" from a venue-provided network. In some embodiments, if the credential has been provided to the subscriber, he/she will automatically be taken to a virtual venue portal of the venue, bypassing the interface 200. Other mechanisms for joining a venue may be used; for example, if a VSCN subscriber is currently visiting the venue (according to location information provided by the subscriber), the subscriber could be given the opportunity to join without providing a password and/or credential, the VCSN subscriber 120 may receive an invitation from another venue member or venue administrator, or the like.

Figure 2B:
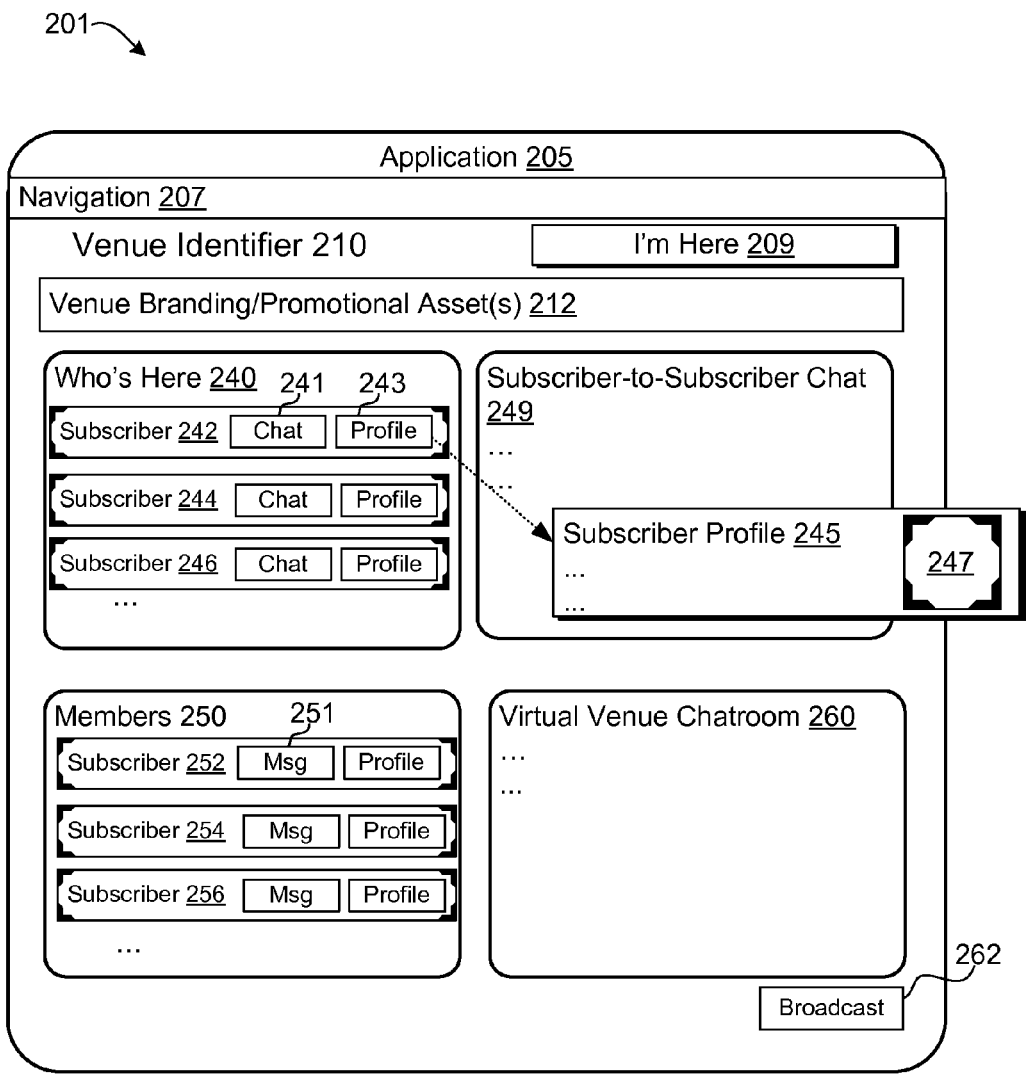
FIG. 2B illustrates one example of a venue web portal (virtual venue)

After becoming a member of the venue (providing the password, etc.), the subscriber may access a member virtual venue interface. One example of a member virtual venue interface is shown in FIG. 2B. The member virtual venue interface 201 may include an "I'm here" input 209, which may allow the subscriber to indicate that he/she is currently at the venue. As discussed above, however, other mechanisms for indicating that a subscriber is at a particular venue could be employed (e.g., push from venue network, location aware device, etc.).

The virtual venue interface 201 may include a "Who's here" list 240 comprising the subscribers who are currently at the identified venue (and whose privacy settings allow their venue attendance to be displayed). The list 240 may include a plurality of subscriber indicators 242, 244, and 246, each of which may be associated with a chat input 241 and a profile input 243. The subscriber indicators 242, 244, and/or 246 may include information about the subscriber, such as the subscriber user name, profile picture, avatar, or the like. Additional profile information may be accessed by selecting the profile input 243, which may cause an expanded view 245 of the subscriber profile to the displayed. The expanded subscriber profile view 245 may include a subscriber photo 247 and/or other profile information in accordance with privacy and/or access settings of the subscriber.

Selection of the chat input 241 may be used to initiate a chat session (or other communication) with the subscriber 242. In the FIG. 2B example, selection of the chat input 241 may activate a subscriber-to-subscriber chat component 249, which may provide a chatroom- or "instant messaging-" style communication with a selected subscriber (depending upon the contact and/or blocking preferences of the selected subscriber). In some embodiments, the "Who's here" list 240 (and/or other features of the interface 201) may only be available to venue members who are currently visiting the venue (as indicated by "I'm here" messages transmitted by the members). Alternatively, the list 240 may be available to all venue members regardless of whether the members are currently at the venue. Moreover, inclusion in the "Who's here" list 240 may be predicated on subscriber-specific privacy controls. For example, a subscriber may specify that he/she is only to be visible to a pre-determined set of subscribers ("friends") selected by the subscriber and/or that he/she is only to be visible to other subscribers that are currently visiting the physical location of the venue.

The interface 201 may further comprise a member list 250, which may comprise indicators 252 of the venue members that are either not online and/or are not currently at the venue. The subscriber may send a message to the offline subscribers using the message input 251. In one example, the message input 251 may be adapted to transmit an "invitation" message to a selected subscriber to invite the subscriber to attend the venue. The virtual venue interface may further include a venue chatroom 260 or message board, in which all venue members may post messages that are visible to all the venue members currently accessing the interface 201. In some embodiments, the chatroom 260 may be accessible only to those subscribers currently attending the venue.

The interface may include a broadcast input 262, which may be by subscribers to broadcast messages to predetermined subscribers (per broadcast settings, subscriber privacy settings, venue privacy settings, or the like). For example, a subscriber may broadcast a message to a predetermined set of subscribers ("friends") regardless of their current location and/or venue membership. In other examples, broadcast messages may be limited to subscribers currently visiting the venue. In some embodiments, broadcast messages may be displayed via the interface 201 (e.g., the venue chatroom 260); alternatively, or in addition, broadcast messages may be forwarded directly to recipients (e.g., via a text message, email, or the like).

Figure 3:
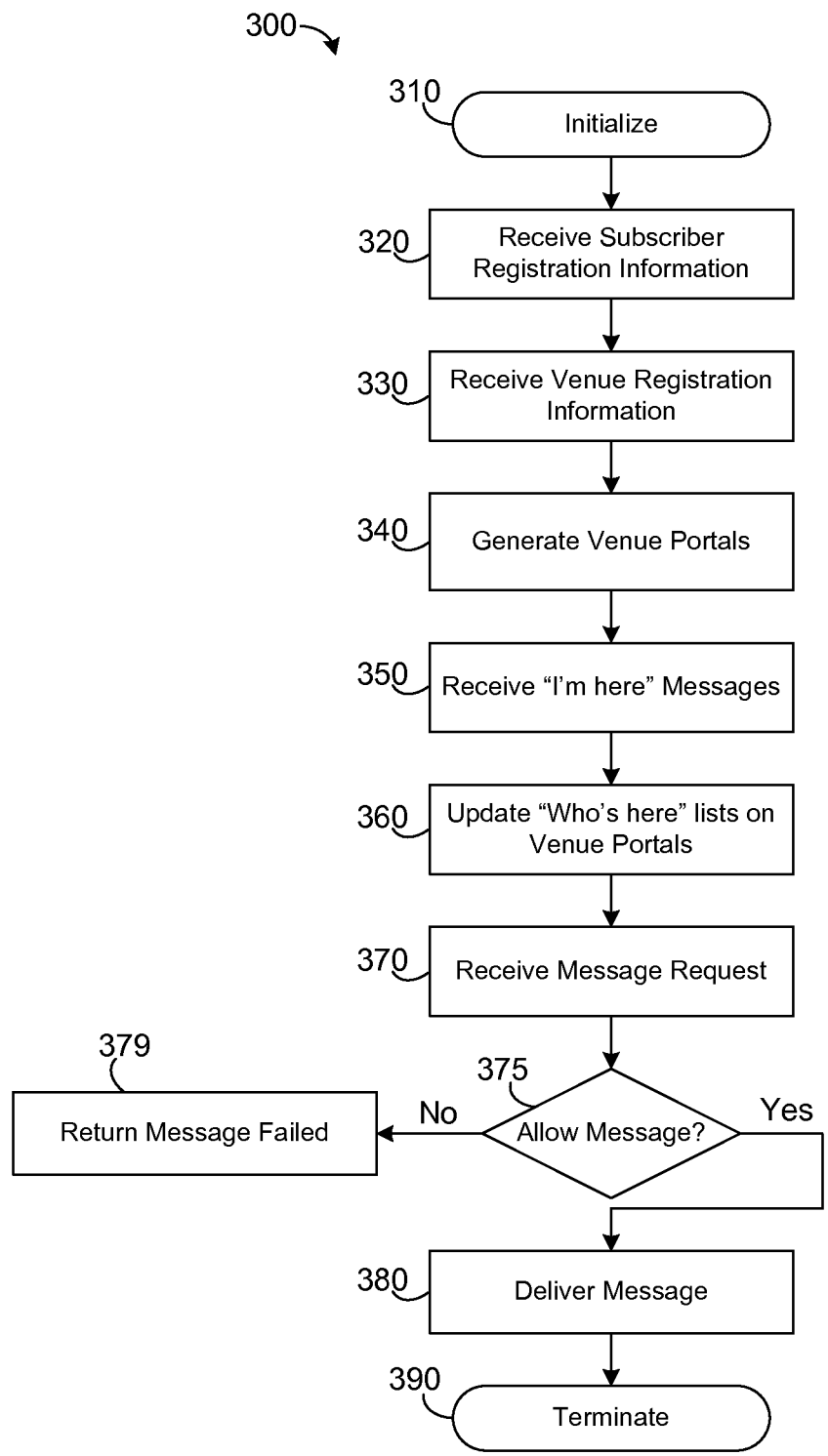
FIG. 3 is a flow diagram of one embodiment of a method for providing venue-centric social networking services.

FIG. 3 is a flow diagram of one embodiment of a method 300 for providing venue-aware social networking services. The method 300 may comprise one or more machine executable instructions stored on a non-transitory computer-readable storage medium. The instructions may be configured to cause a machine, such as a computing device, to perform steps of the method 300. In some embodiments, the instructions may be embodied as one or more distinct software modules on the storage medium. One or more of the instructions and/or steps of method 300 may interact with one or more hardware components, such as non-transitory computer-readable storage media, communications interfaces, or the like. Accordingly, one or more of the steps of method 300 may be tied to particular machine components.

At step 310, the method 300 may be initialized, which may comprise loading one or more instructions from a non-transitory computer-readable storage medium, accessing and/or initializing resources for the method 300, and the like.

At step 320, the method 300 may receive registration information from one or more VCSN subscribers. The registration information may include a name of the subscriber, contact information for the subscriber, gender, and so on. The registration information may further comprise an avatar, image, or other descriptive information. The registration information may include privacy settings, which may control the dissemination of subscriber profile information within the VCSN. Privacy settings may also determine if/when the subscriber may be contacted by other subscribers and/or determine the visibility of the subscriber's "I'm here" updates. At step 320, the registration information may be stored on a non-transitory computer-readable storage medium.

At step 330, the method 300 may receive registration information pertaining to one or more venues. The information received at step 330 may relate to sponsored and/or un-sponsored venues. If the information received at step 330 relates to a sponsored venue, step 330 may comprise verifying that the submitter of the registration information is authorized to act on behalf of the sponsoring organization. At step 330, the venue registration information may be stored on a non-transitory computer-readable storage medium.

At step 340, a portal for each of the registered venues may be generated. As described above, a venue portal or "virtual venue" may include a list of venue members, a list of venue members that are currently at the venue (a "Who's here" list), a messaging and/or contact interface, and the like. At step 340, the generated venue interface may be stored in a non-transitory computer-readable storage medium.

At step 350, an "I'm here" message may be received from one or more subscribers. In some embodiments, step 350 may comprise verifying that the subscribers are actually at the identified venues (based upon location identifying information, a venue provided credential or password, or the like). Responsive to receiving (and/or verifying) the "I'm here" messages, an "I'm here" flag associating the subscribers with the respective venues may be set (e.g., in subscriber profiles stored on the non-transitory computer-readable storage medium).

At step 360, the "Who's here" lists of the venues identified in the one or more "I'm here" messages may be updated and stored on the computer-readable media. Updating the "Who's here" lists may comprise updating the virtual venue interfaces (or components thereof) generated at step 340. Step 360 may further comprise applying privacy settings of the subscribers who have submitted "I'm here" messages at step 350. The privacy settings may determine the visibility of the subscribers in the "Who's here" listings. For example, a subscriber may specify that his "I'm here" status should only be visible to a predetermined set of VCSN users. Accordingly, the subscriber will be omitted from the "Who's here" list as seen by subscribers not in the predetermined set. Alternatively, or in addition, subscribers (or the venue itself) may specify that only those subscribers who are currently at the venue may have access to the "Who's here" list.

At step 370, a message from a first subscriber to a second subscriber may be received. The first subscriber and the second subscribers may both be attending the same venue (according to the "I'm here" flag associated with the first and second subscribers). At step 375, and responsive to the message, the method 300 may consult messaging preferences of the second subscriber to determine whether the message should be delivered. If at step 375, the message is not to be delivered, the flow may continue to step 379, where the method 300 may return a failure indication to the first subscriber. If the message is to be delivered, the flow may continue to step 380.

At step 380, the message may be transmitted to the second subscriber. The transmission of step 380 may include selecting the preferred messaging format and/or system of the second subscriber (e.g., SMS, instant message, etc.), translating the message into a selected format (if necessary), and transmitting the message using the selected messaging system.

At step 390, the flow may terminate until additional subscriber and/or venue registration information, "I'm here" messages, messaging requests, or the like are received.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a processor within a general-purpose or special-purpose computing device, such as a personal computer, a laptop computer, a mobile computer, a personal digital assistant, smart phone, or the like. Alternatively, the steps may be performed by hardware components that include specific logic for performing the steps, or by a combination of hardware, software, and/or firmware.

Embodiments may also be provided as a computer program product including a non-transitory computer-readable storage medium having stored instructions thereon that may be used to program a computer (or other electronic device) to perform processes described herein. The non-transitory computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of this disclosure.

We claim:

1. A non-transitory computer-readable storage medium comprising instructions configured to cause a computing device to perform a method for providing a venue-centric social network, the method comprising:
   registering one or more venues in the venue-centric social network, each venue associated with a respective physical location;
   receiving check-in messages from a plurality of subscribers, each check-in message comprising an indication that a respective one of the plurality of subscribers is currently physically visiting a first venue registered with the venue-centric social network;
   generating a list identifying the plurality of subscribers associated with the received check-in messages that are currently physically visiting the first venue based on the indications of the received check-in messages; and
   providing the list to a subscriber that is not currently physically visiting the first venue.

2. The non-transitory computer-readable storage medium of claim 1, wherein the first venue is sponsored by an organization.

3. The non-transitory computer-readable storage medium of claim 1, wherein the first venue is sponsored by an organization, and wherein registering the first venue comprises verifying that a subscriber attempting to register the first venue is authorized to act on behalf of the sponsoring organization.

4. The non-transitory computer-readable storage medium of claim 1, wherein the first venue is un-sponsored, and wherein a first physical location associated with the first venue is publicly accessible.

5. The non-transitory computer-readable storage medium of claim 1, wherein access to the list of subscribers currently physically visiting the first venue is based on privacy settings of the first venue.

6. The non-transitory computer-readable storage medium of claim 5, wherein the privacy settings of the first venue control access to the list of subscribers by one of:
restricting access to subscribers that are members of the first venue; and
restricting access to subscribers that are members of the first venue and that are currently physically visiting the first venue.

7. The non-transitory computer-readable storage medium of claim 1, the method further comprising:
registering one or more subscribers of the venue-centric social network, wherein subscriber registration comprises generating a subscriber profile for each subscriber; and
displaying subscriber profile information in the list of subscribers that are currently physically visiting the first venue.

8. The non-transitory computer-readable storage medium of claim 7, wherein the subscriber profiles comprise privacy settings, the method further comprising:
determining whether a first subscriber currently physically visiting the first venue is to be included in the list based on privacy settings of the first subscriber.

9. The non-transitory computer-readable storage medium of claim 8, wherein the list of subscribers currently physically visiting the first venue is generated for a second subscriber, and wherein determining whether the first subscriber is to be included in the list for the second subscriber is based on the privacy settings of the first subscriber and a relationship between the first subscriber and the second subscriber in the venue-centric social network.

10. The non-transitory computer-readable storage medium of claim 8, wherein the list of subscribers currently physically visiting the first venue is generated for a second subscriber, and wherein determining whether the first subscriber is to be included in the list for the second subscriber is based on the privacy settings of the first subscriber and whether the second subscriber is currently physically visiting the first venue.

11. The non-transitory computer-readable storage medium of claim 1, the method further comprising providing a virtual venue interface for each of the one or more venues, each virtual venue interface comprising a list of subscribers currently physically visiting a corresponding registered venue.

12. The non-transitory computer-readable storage medium of claim 11, the method further comprising granting membership in the first venue to a subscriber when the subscriber physically visits the first venue.

13. The non-transitory computer-readable storage medium of claim 11, the method further comprising restricting access to the virtual venue interface of the first venue to subscribers that are currently physically visiting the first venue.

14. The non-transitory computer-readable storage medium of claim 1, the method further comprising:
receiving a broadcast message from a first subscriber currently physically visiting the first venue; and
forwarding the broadcast message to subscribers of the venue-centric social network in accordance with privacy settings, the forwarding comprising one of:
forwarding the broadcast message to subscribers that are currently physically visiting the first venue;
forwarding the broadcast message to a pre-determined subset of subscribers specified by privacy settings of the first subscriber; and
forwarding the broadcast message to subscribers in the pre-determined subscriber subset that are currently physically visiting the first venue.

15. The non-transitory computer-readable storage medium of claim 1, the method further comprising:
receiving a message from a first subscriber directed to a second subscriber, the first and the second subscribers both currently physically visiting the first venue; and
forwarding the message to the second subscriber.

16. The non-transitory computer-readable storage medium of claim 1, wherein the list of subscribers currently physically visiting the first venue includes an input to initiate contact between subscribers, the method further comprising:
receiving a request from a first subscriber to initiate contact with a second subscriber, wherein both the first and the second subscribers are members of the first venue and are currently physically visiting the first venue; and
initiating contact when permitted by privacy settings of the second subscriber.

17. The non-transitory computer-readable storage medium of claim 16, wherein initiating contact comprises forwarding a message from the first subscriber to the second subscriber.

18. The non-transitory computer-readable storage medium of claim 16, wherein initiating contact comprises providing the first subscriber with contact information of the second subscriber.

19. A method for providing venue-centric social networking services to a plurality of subscribers, the method comprising:
using a computing device to perform the steps of,
registering a venue associated with a physical location;
receiving messages from subscribers, the messages comprising indications that specified subscribers are currently physically visiting the physical location associated with the registered venue;
identifying subscribers that are currently physically visiting the physical location associated with the registered venue based on the indications of the received messages;
providing a virtual venue interface representing the registered venue, the virtual venue interface comprising a list of the identified subscribers that are currently visiting the physical location associated with the registered venue; and
providing the list of the identified subscribers that are currently visiting the physical location associated with the registered venue to a subscriber that is not currently physically visiting the physical location associated with the registered venue.

20. The method of claim 19, further comprising evaluating privacy settings of the subscribers identified as currently physically visiting the physical location associated with the registered venue, wherein subscribers are included in the list of subscribers when permitted by the respective subscriber privacy settings.

21. The method of claim 19, wherein the list of subscribers that are currently physically visiting the physical location associated with the registered venue is generated for a first subscriber, the method further comprising:
evaluating privacy settings of the subscribers identified as currently physically visiting the physical location associated with the registered venue; and
including the identified subscribers in the list of subscribers when permitted by privacy settings of the respective identified subscriber.

22. The method of claim 19, further comprising:
  receiving a message from a subscriber that includes location coordinates; and
  determining whether the subscriber is currently physically visiting the physical location associated with the registered venue using the location coordinates.

23. The method of claim 19, wherein the list of subscribers currently physically visiting the physical location associated with the registered venue includes an input to initiate subscriber contact, the method further comprising:
  receiving a request from a first subscriber to initiate contact with a second subscriber, the first and the second subscribers both currently physically visiting the physical location associated with the registered venue; and
  initiating contact between the first subscriber and the second subscriber in response to the request.

24. The method of claim 23, wherein initiating contact comprises one of forwarding a message received from the first subscriber to the second subscriber using a network, and providing contact information of the second subscriber to the first subscriber using the network.

25. The method of claim 23, the method further comprising accessing privacy settings of the second subscriber, wherein contact is initiated between the first subscriber and the second subscriber when permitted by the privacy settings.

26. A system for providing a venue-centric social networking service, comprising:
  a computing device configured to register a plurality of venues in a venue-centric social network, each venue being associated with a respective physical location;
  the computing device configured to receive messages from subscribers of the venue-centric social network, the messages comprising an indication that a respective subscriber is currently physically visiting a physical location associated with a first one of the registered venues;
  the computing device configured to generate a list of subscribers that are currently physically visiting the physical location associated with the first registered venue based on the indications of the received messages
  the computing device configured to provide the list of the identified subscribers that are currently physical visiting the physical location associated with the first registered venue to a subscriber that is not currently physically visiting the physical location associated with the first registered venue; and
  the computing device providing for initiating contact between a first subscriber and a second subscriber currently physically visiting the first registered venue through a virtual venue interface of the first venue.

27. The non-transitory computer-readable storage medium of claim 1, wherein the first venue is configured to expire at a pre-determined time.

* * * * *